US00RE35429E

United States Patent [19]

Kondo

[11] E Patent Number: Re. 35,429

[45] Reissued Date of Patent: Jan. 21, 1997

[54] SPARK PLUG AND THE METHOD OF MANUFACTURING THE SAME

[75] Inventor: Ryoji Kondo, Okazaki, Japan

[73] Assignee: Nippendenso Co., Ltd., Kariya, Japan

[21] Appl. No.: 73,706

[22] Filed: Jun. 9, 1993

Related U.S. Patent Documents

Reissue of:

[64] Patent No.: 4,893,051
Issued: Jan. 9, 1990
Appl. No.: 712,917
Filed: Mar. 18, 1985

U.S. Applications:

[63] Continuation of Ser. No. 372,148, Apr. 27, 1982, abandoned.

[30] Foreign Application Priority Data

Apr. 30, 1981 [JP] Japan ..... 56-66725
May 7, 1981 [JP] Japan ..... 56-68758

[51] Int. Cl.[6] ..... H01J 13/20

[52] U.S. Cl. ..... 313/141; 313/136

[58] Field of Search ..... 313/141, 141.1, 313/130, 142

[56] References Cited

U.S. PATENT DOCUMENTS

| | | | |
|---|---|---|---|
| 1,160,911 | 11/1915 | Latch . | |
| 2,292,974 | 8/1942 | Smithells . | |
| 2,296,033 | 9/1942 | Heller . | |
| 2,406,172 | 8/1946 | Smithells . | |
| 3,146,370 | 8/1964 | Van Duyne et al. | 313/136 |
| 3,407,326 | 10/1968 | Romine . | |
| 4,122,366 | 10/1978 | Von Stutterheim et al. | 313/141 |
| 4,465,952 | 8/1984 | Sato et al. | 313/136 |
| 4,488,081 | 12/1984 | Kondo et al. | 313/141 |

FOREIGN PATENT DOCUMENTS

| | | |
|---|---|---|
| 31-604 | 1/1956 | Japan . |
| 50-4132 | 5/1973 | Japan . |
| 50-157733 | 12/1975 | Japan . |
| 51-87637 | 7/1976 | Japan . |
| 53-38046 | 9/1978 | Japan . |
| 55-80892 | 6/1980 | Japan . |
| 479540 | 2/1938 | United Kingdom . |
| 1497641 | 5/1976 | United Kingdom . |
| 2234920 | 2/1991 | United Kingdom . |

OTHER PUBLICATIONS

Ishifuku Kinzoku Kogyo, "Ishifuku Noble Metal Electrode", Sep., 1978, pp. 4–5.

Nikkan Kogyo Shinbunsha, "Illustrated Mechanical Term Dictionary", Jan. 30, 1978, (18th Version), pp. 336–337.

Sohbunkan, "Latest Mechanical Engineering", Jan. 25, 1965, pp. 138–141.

*Primary Examiner*—Sandra L. O'Shea
*Attorney, Agent, or Firm*—Cushman Darby & Cushman, L.L.P.

[57] ABSTRACT

A spark plug for internal combustion engines provided with a noble metal tip on the pointed top of a spark plug center electrode. The noble metal tip is welded to the center electrode top end by heating and pressing the portion to be welded. After the welding, the center electrode is shaped to provide the pointed top. The noble metal tip is a platinum alloy consisting of platinum of 85 through 70 in weight percentage and iridium of 15 through 30 in weight percentage.

15 Claims, 2 Drawing Sheets

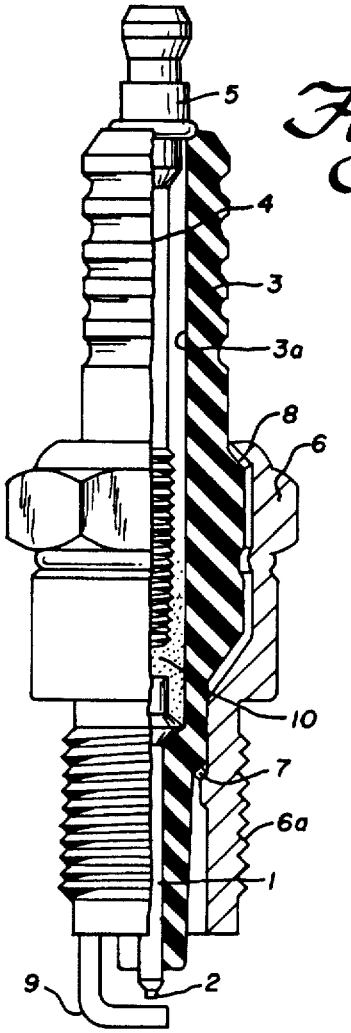
Fig. 1
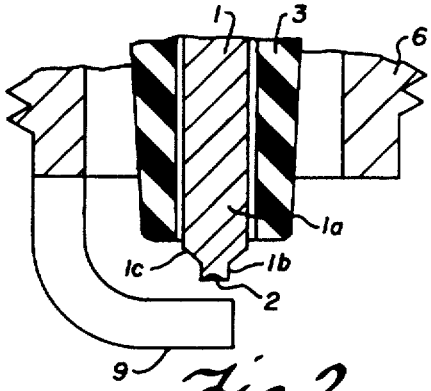
Fig. 2
Fig. 3
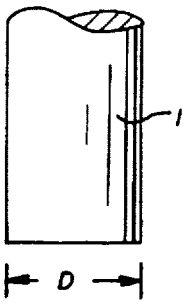
Fig. 4
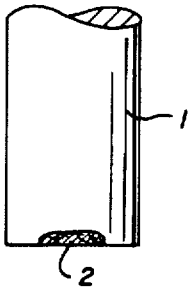
Fig. 5
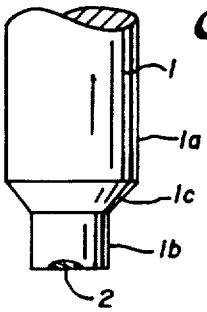
Fig. 6
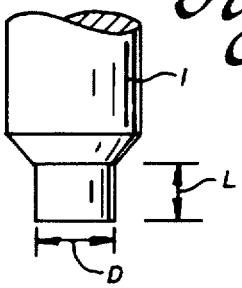

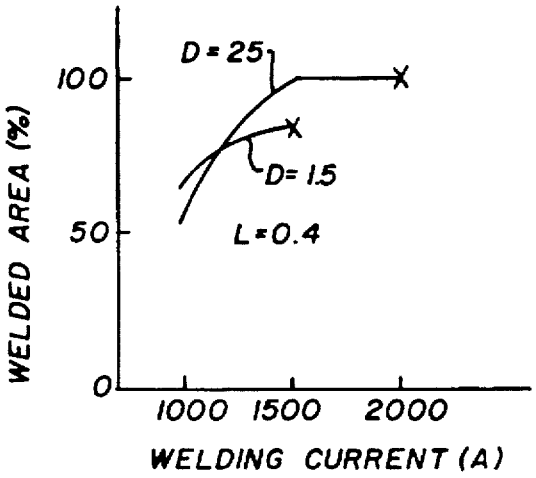
Fig. 7
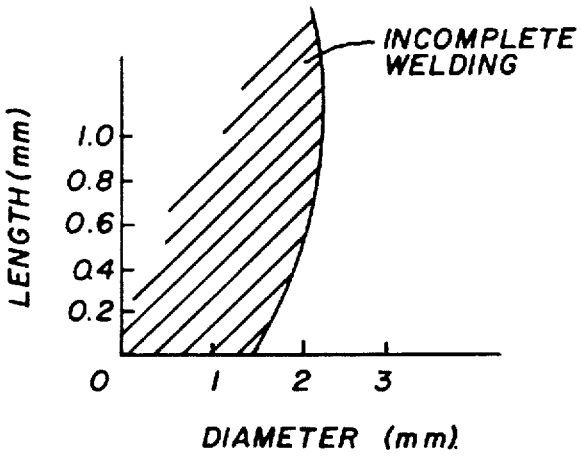
Fig. 8
Fig. 9
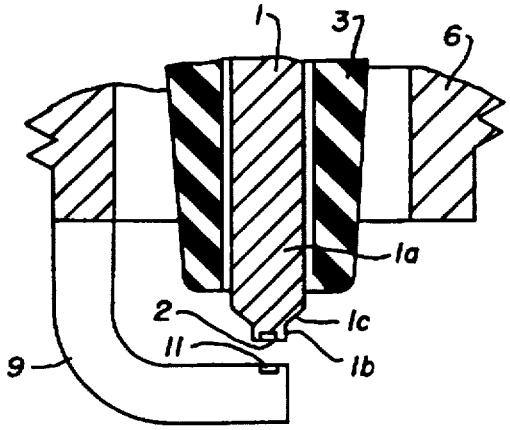

SPARK PLUG AND THE METHOD OF MANUFACTURING THE SAME

Matter enclosed in heavy brackets [ ] appears in the original patent but forms no part of this reissue specification; matter printed in italics indicates the additions made by reissue.

This is a continuation, of application Ser. No. 372,148, filed Apr. 27, 1982, abandoned.

BACKGROUND OF THE INVENTION

The present invention relates to a spark plug for an internal combustion engine and a method for manufacturing the same, and more particularly to a spark plug provided with a noble metal tip on the center electrode top end opposing the ground electrode and a method for manufacturing the same having such a center electrode.

Spark plugs used to ignite a combustible mixture supplied to internal combustion engines are subjected, during long use, to electrode wear which degrades the spark discharge characteristics of the spark plug. It has been suggested that the spark plug be provided with a noble metal such as platinum on the top end of the center electrode where the spark discharge is generated to thereby enhance the durability and hence maintain the desired spark discharge characteristics.

One type of spark plug suggested in Japanese Utility Model publication No. 53-38046 and Japanese Patent Laid-open No. 51-66945, for example, is provided with a noble metal tip plugged up in a recess drilled axially in the center electrode top end opposing the ground electrode. This spark plug requires a drilling process to form the recess and requires a considerable quantity of noble metal tip to fill the recess to the extent that the noble metal tip is free of attrition or the like, thus resulting in impracticality for commercial production with respect to manufacturing cost.

The other type of spark plug suggested in Japanese Utility Model Laid-open No. 54-92227, for example, is provided with a noble metal coating over the center electrode top end. The bonding between the center electrode and the coating is not sufficient to prevent attrition of the coated noble metal caused during long use by the heat deterioration of the noble metal and the oxidization of the electrode material, thus also resulting in impracticality for commercial production with respect to product durability.

SUMMARY OF THE INVENTION

It is therefore a primary object of the present invention to provide a spark plug and a method of manufacture therefor which improve the above drawbacks.

It is a further object of the present invention to provide a spark plug and a method of manufacture therefor which are more practical for commercial production with regard to manufacturing cost and product durability.

It is a still further object of the present invention to provide a spark plug and a method of manufacture therefor which use a lesser quantity of noble metal but assures sufficient bonding between the center electrode and the noble metal so that the spark plug can be used for a longer period of time without electrode wear.

According to the present invention, a noble metal shaped in a thin disk tip is welded to the center electrode top end by resistance welding. Then the top end portion of the center electrode is cut circumferentially to provide the center electrode with a pointed top on which the noble metal remains welded. The noble metal tip welded to the center electrode top end is a platinum alloy including iridium of 15 through 30 in weight percentage.

BRIEF DESCRIPTION OF THE DRAWINGS

In the accompanying drawings,

FIG. 1 is a side view showing, partly in cross section, a spark plug according to a first embodiment of invention;

FIG. 2 is an enlarged view showing, in cross section, a part of the spark plug shown in FIG. 1;

FIGS. 3 through 5 are side views showing the process of manufacturing the center electrode of the spark plug shown in FIGS. 1 and 2;

FIG. 6 is a side view showing the center electrode having a pointed top;

FIG. 7 is a chart showing the relation between the welding current and the bonding surface between the center electrode and the noble metal tip;

FIG. 8 is a chart showing the relation between the bonding area of the noble metal tip to the center electrode and the configuration of the center electrode pointed top determined in terms of the length and diameter thereof; and FIG. 9 is an enlarged view, showing in cross section a part of the spark plug according to a second embodiment of the present invention.

DETAILED DESCRIPTION OF THE PREFERRED EMBODIMENT

Referring first to FIGS. 1 and 2 showing a first embodiment of the present invention, a center electrode 1, made of a base metal including nickel, chrome and other elements (as known in the art), and which is electrically conductive, heat resistant and corrosion resistant is securely encased and supported in an insulator 3. As shown in FIG. 2, the center electrode 1 is formed with a pointed top 1b of small diameter which extends from a trunk 1a of large diameter through a taper 1c. The pointed top 1b assures good spark discharge characteristics, and the taper 1c promotes the propagation of flame generated by the spark discharge. A noble metal 2, such as platinum shaped in a small disk which is 0.7 mm in diameter and 0.3 mm in thickness, for example, is welded to the top end of the center electrode pointed top 1b. An electrically conductive carbon rod 4 is inserted in the axial through hole 3a of the insulator 3. An electrically conductive brass terminal 5 is in threaded engagement with the carbon rod 4. A cylindrical housing 6 made of an electrically conductive, heat resistant and corrosion resistant metal securely encases the bottom half of the insulator 3 therein, through an airtight ring packing 7 and a caulking ring 8. The housing 6 has a thread portion 6a to be threaded to the cylinder head of an internal combustion engine (not shown). A ground electrode 9 made of the like base metal as the center electrode 1 is welded at one end thereof to the bottom end of the housing 6 to be electrically conductive therewith and is bent to face the pointed top 1b of the center electrode 1 leaving an air gap therebetween. The electrodes 1 and 9 are electrically insulated by the insulator 3 and the air gap. An electrically conductive glass seal 10 which is a mixture of copper powder and glass having a low melting point (as known in the art) is filled in the through hole 3a of the insulator 3 to electrically connect the center electrode 1 with the carbon rod 4 and to securely support the same within the insulator 3.

The spark plug, and the center electrode in particular, described with reference to FIGS. 1 and 2, is manufactured in the following manner. The base metal of the center electrode 1 of a uniform diameter is prepared first as shown in FIG. 3. Next, as shown in FIG. 4, the noble metal tip 2 is welded to the flat end surface of the center electrode by resistance welding by flowing a sufficient electric welding current under the condition where the portion to be welded are kept heated and pressed together so that the noble metal tip 2 is completely welded. Then the top end portion of the center electrode 1 is circumferentially cut to shape the pointed top lb and the taper 1c as shown in FIG. 5. The pointed top 1b may be formed alternatively by pressing, cold forging or the like after the welding of the noble metal tip 2 to the top end of the center electrode 1. The diameter of the pointed top 1b is preferably kept larger than that of the welded noble metal tip 2 so that no expensive noble metal is wasted. The center electrode 1 thus manufactured is assembled with other elements as shown in FIG. 1 in a well know manner.

It is to be noted that, in order to prevent the welded noble metal tip 2 from attrition or the like caused by oxidization and corrosion of the welded portion which is subjected to the high combustion pressure and temperature of the internal combustion engine, the noble metal tip 2 must be welded completely to the center electrode 1. That is, the noble metal tip 2 must have sufficient welded area all over the surface to provide a strong bonding with the center electrode 1. For this purpose, it is desired to supply a higher electric welding current to the center electrode 1 and the noble metal tip 2 during the resistance welding. Since the higher electric current generated higher Joule heat to soften the center electrode 1, the center electrode 1 to which the pressing force is applied during the welding tends to buckle, thus disabling the electric welding current to flow sufficiently and the noble metal tip 2 to be welded completely to the center electrode 1. Therefore, the diameter of the top end of the center electrode 1 to which the noble metal tip 2 is welded should be as large as possible to prevent the buckling thereof. Thus it should be understood that the manufacturing method described hereinabove with reference to FIGS. 3 through 5 is more advantageous in assuring a complete welding of the noble metal tip 2 to the center electrode 1 than that in which the noble metal tip 2 is welded to the center electrode 1 after the pointed top lb is shaped as shown in FIG. 6.

The results of an experiment conducted to investigate the sufficiency of bonding between the center electrode 1 and the noble metal tip 2 is shown in FIG. 7 in which the abscissa and the ordinate indicate, respectively, the electric welding current in amperes and the welded area of the noble metal tip 2 in percentage. In the experiment, a platinum disk of 0.7 mm in diameter and 0.3 mm in thickness was welded to two kinds of center electrodes, the base metal, Ni-2Cr-3Mn-1.8Si, of which were the same in alloy composition but shaped differently as shown in FIGS. 3 and 6. The a.c. electric welding current was applied during the interval of 0.17 sec. under a pressing force of 28 kg. As can be seen from FIG. 7, the platinum tip could be completely welded to the center electrode 1 which, as shown in FIG. 3, had a large diameter of 22.5 mm at the top end, while it could not be sufficiently welded to the center electrode 1 which, as shown in FIG. 6, had a pointed top of 1.5 mm in diameter and 0.4 mm in length. The cross mark in FIG. 7 indicates the point at which the center electrode 1 began to buckle. The center electrodes shaped as shown in FIGS. 3 and 6 began to buckle after and before the platinum tip was completely welded, respectively.

A further result of the experiment is shown in FIG. 8 in which the abscissa and the ordinate indicate, respectively, the diameter D and the length L of the pointed top of the center electrode shaped prior to the welding of the platinum tip as shown in FIG. 6. The hatched region in FIG. 8 shows the condition where the welding of the platinum tip to the center electrode top end was incomplete, that is, the center electrode top end began buckling before the platinum tip was completely welded to the center electrode top end.

From these experiments, it should be clear that, in order to assure the complete welding of the noble metal tip 2 to the top end of the center electrode, the welding of the noble metal tip 2 to the top end of the center electrode 1 need be performed prior to the shaping of the pointed top 1b.

Reference is made next to FIG. 9 which shows a second embodiment of the present invention. The spark plug according to the second embodiment, although manufactured in the same manner as that of the first embodiment, primarily differs therefrom in that, besides the noble metal tip 2 which is 0.7 mm in diameter and 0.3 mm in thickness and welded to the center electrode top end 1b, a further noble metal tip 11 which is 1.2 mm in diameter and 0.2 through 0.3 mm in thickness is welded by resistance welding to the ground electrode 9 to face the noble metal tip 2. The ground electrode 9 maintains a uniform thickness and width, since no shaping is performed thereon after the welding of the noble metal tip 11. The noble metal tips 2 and 11 are a platinum alloy consisting essentially of platinum, 85 through 70 in weight percentage, and iridium, 15 through 30 in weight percentage.

The attrition or coming off of the noble metal tip from the electrode base metal generally results from oxidization and corrosion of the welded portion through cracks which are caused axially from the top end surface of the tip and radially from the circumferential surface of the tip. The radial cracking may be lessened by increasing the thickness of the noble metal tip by several hundred microns, which is preferably limited to 0.5 mm in view of the durability and the manufacturing cost. On the other hand, axial cracking does not deepend on the tip shape but depends on the composition of the noble metal tip. Therefore, the composition of the noble metal tip must be determined so that the noble metal tip causes the least cracking.

An experiment was conducted to investigate the development of the axial cracking, wherein each platinum alloy tip is subjected repeatedly, two hundred times, to a heat-and-cold cycle test in which the platinum alloy tip is kept first at 850° C. for six minutes and then at room temperature for six minutes. The results of this experiment are shown in the following table, wherein Pt, Rh and Ir indicates platinum, rhodium and iridium, respectively.

| Composition | Axial Cracking |
|---|---|
| 100 wt. % Pt | Largest |
| 95 wt. % Pt - 5 wt % Rh | Largest |
| 90 wt. % Pt - 10 wt. % Rh | Largest |
| 85 wt. % Pt - 15 wt. % Rh | Largest |
| 80 wt. % Pt - 20 wt. % Rh | Large |
| 75 wt. % Pt - 25 wt. % Rh | Large |
| 70 wt. % Pt - 30 wt. % Rh | Large |
| 95 wt. % Pt - 5 wt. % Rh | Largest |
| 90 wt. % Pt - 10 wt. % Ir | Large |

-continued

| Composition | Axial Cracking |
|---|---|
| 85 wt. % Pt - 15 wt. % Ir | Little |
| 80 wt. % Pt - 20 wt. % Ir | Least |
| 75 wt. % Pt - 25 wt. % Ir | Least |
| 70 wt. % Pt - 30 wt. % Ir | Least |

The maximum weight percentage of iridium to be included in the platinum alloy must be limited to, preferably 30 in weight percentage from the fact that iridium is more expensive and harder than platinum. If too much iridium is to be included, a sheet metal of platinum alloy which is pressed to produce the platinum alloy tip becomes too hard to be pressed with ease.

It should be understood that the platinum alloy including the platinum, 85 through 70 in weight percentage, and the iridium, 15 through 30 in weight percentage is preferable, and that the platinum alloy including the platinum, 80 through 70 in weight percentage, and the iridium, 20 through 30 in weight percentage, is more preferable.

It is to be pointed out here that the same experimental result as reported in the foregoing table was obtained in another experiment in which spark plugs provided with respective platinum alloy tips were used to run an internal combustion engine (4 cylinder, 4 stroke, 1,600 cc) at 5,000 r.p.m. with a full-open throttle for 100 hours. It is to be pointed out further that the platinum alloy tip 2 of 0.9 mm in diameter and 0.4 mm in thickness and the platinum alloy tip 11 of 0.7 mm in diameter and 0.3 mm in thickness, each including iridium of 20 weight percentage, has presented excellent crackfree characteristics.

The present invention described hereinabove is not limited to the above embodiments but may be modified so that the platinum alloy tips 2 and 11 include one or more metals selected from silver, gold, palladium, ruthenium and osmium in addition to iridium of 15 through 30 in weight percentage, the center electrode and the ground electrode are made of INCONEL 600, available from INCO Company in Canada, which is very resistant to oxidization and corrosion, and the ground electrode 9 is provided with no noble metal tip. As should be apparent, the work 'top ' is arbitrarily used herein to designate one axial end of the spark plug without requiring any particular spatial orientation of the spark plug when in use.

What is claimed is:

1. A spark plug for internal combustion engines comprising:

a ground electrode made of an electrically conductive base metal;

a center electrode made of an electrically conductive base metal and provided with a noble metal tip only on a flat end of a tapered end portion thereof, said noble metal tip facing said ground electrode through an air gap said noble metal tip being completely resistance welded under mechanical pressure to said electrically conductive base metal to provide a strong bond therebetween; and an insulator securely encasing said center electrode and electrically insulating said center electrode from said ground electrode, wherein said noble metal tip is made of a platinum alloy consisting essentially of 70–80 percent platinum, by weight, and 30–20 percent iridium, by weight, and wherein said center electrode is manufactured by the steps of:

preparing the base metal of said central electrode having a uniform diameter;

welding said noble metal tip to the top end surface of said center electrode; and shaping said center electrode to provide said flat end of said tapered end portion to be smaller in diameter than said center electrode axially beyond said tapered end portion.

2. A spark plug according to claim 1, wherein said welding step is performed by heating and pressing the portion to be welded.

3. A spark plug according to claim 1, wherein said center electrode is provided by said shaping step with a tapered end portion which gradually reduces the diameter thereof toward said flat end.

4. A spark plug according to claim 3, wherein said ground electrode is provided with a further noble tip metal facing said noble metal tip of said center electrode.

5. A spark plug according to claim 4, wherein said noble metal tips are less than 0.5 mm in thickness and consist of platinum of 80 through 70 in weight percentage and iridium of 20 through 30 in weight percentage.

6. A spark plug for internal combustion engines comprising:

a ground electrode made of an electrically conductive base metal;

a center electrode made of an electrically conductive base metal and provided with a flat end of a tapered end portion which is smaller in diameter than said center electrode axially beyond said tapered end portion and which flat end faces said ground electrode;

an insulator securely encasing said center electrode and electrically insulating the same from said ground electrode; and a platinum alloy tip welded only to said flat end of said center electrode tapered end portion and consisting essentially of 70–80 percent platinum, by weight, and 30–20 percent iridium.

7. A spark plug according to claim 6, wherein said center electrode is provided with a tapered end portion which gradually reduces the diameter thereof toward said flat end, and wherein said platinum alloy tip is less than 0.5 mm in thickness.

8. A spark plug according to claim 6 or 7, further comprising:

a platinum alloy tip welded to said ground electrode to face said platinum alloy tip on said center electrode flat end, said platinum alloy tip on said ground electrode including iridium of at least 15 percent by weight but less that 30 percent by weight and less than 0.5 mm in thickness.

9. A spark plug according to claim 8, wherein said platinum alloy tip on said ground electrode includes iridium of 20 through 30 in weight percentage.

10. A spark plug according to claim 8, wherein said platinum alloy tip on said ground electrode consists of platinum of 85 through 70 in weight percentage and iridium of 15 through 30 in weight percentage.

11. A spark plug according to claim 8, wherein said platinum alloy tip on said ground electrode consists of platinum of 80 through 70 in weight percentage and iridium of 20 through 30 in weight percentage.

*12. A spark plug according to claim 1, wherein a diameter of the top end surface of the center electrode is larger than the diameter of the noble metal tip so that after the welding step, the noble metal tip is buried inside the flat top end surface of the center electrode.*

*13. A spark plug according to claim 1, wherein the noble metal tip has a first surface and a second surface, the first*

*surface of the noble metal tip is welded to the top end surface of the center electrode and the second surface of the noble metal tip faces the ground electrode so that a spark gap is formed between the second surface of the noble metal tip and the ground electrode.*

*14. A spark plug according to claim 6, wherein a diameter of the top end surface of the center electrode is larger than the diameter of the platinum alloy tip so that after the welding step, he platinum alloy tip is buried inside the flat top end surface of the center electrode.*

*15. A spark plug according to claim 6, wherein the platinum alloy tip has a first surface and a second surface, the first surface of the platinum alloy tip is welded to the end of the center electrode and the second surface of the platinum alloy tip faces the ground electrode so that a spark gap is formed between the second surface of the platinum alloy tip and the ground electrode.*

* * * * *